United States Patent [19]

Ma

[11] Patent Number: 5,633,658
[45] Date of Patent: May 27, 1997

[54] STRUCTURE OF MOUSE

[76] Inventor: Hsi-Kuang Ma, 4F, No. 48, Sec. 2, Chung Cherng Rd., Taipei, Taiwan

[21] Appl. No.: 664,677

[22] Filed: Jun. 17, 1996

[51] Int. Cl.$^6$ .................................................. G09G 5/08
[52] U.S. Cl. ........................... 345/161; 345/163; 345/156; 74/471 XY
[58] Field of Search ..................... 345/156, 157, 345/161, 163, 164, 165, 166, 167; 74/741 XY; 273/148 B; 463/37, 38; D14/114

[56] References Cited

U.S. PATENT DOCUMENTS 4,488,017 12/1984 Lee .......................................... 345/161
5,479,191 12/1995 Komatsu .................................. 345/161

*Primary Examiner*—Kee M. Tung
*Assistant Examiner*—Matthew Luu
*Attorney, Agent, or Firm*—Bacon & Thomas

[57] ABSTRACT

A mouse including a top cover which has press keys for signal input into the computer, a coupling device at the bottom, a downward rod with a center axle hole, and a plurality of locating posts; a circuit board which has an operation circuit and an IC, a plurality of switches corresponding to the press keys of the top cover shell, and a plurality of locating holes respectively connected to the locating posts of the top cover shell by a respective screw; a case-like intermediate shell which has an opening through which the downward rod of the top cover shell pass, a plurality of hook holes near the rear side, and a plurality of screw holes respectively fixed to the coupling device of the top cover shell by screws; and a bottom shell fitting over the intermediate shell at the bottom which has an upright index rod inserted through the opening of the intermediate shell and fitted into the center axle hole of the downward rod of the top cover shell and having a cable connected to the IC of the circuit board, and a plurality of upright hooks respectively hooked in the hook holes of the intermediate shell.

2 Claims, 3 Drawing Sheets

STRUCTURE OF MOUSE

BACKGROUND OF THE INVENTION

The present invention relates to mice, and relates more particularly to such a mouse which controls the movement of the cursor by moving an index rod.

FIG. 1 shows a mouse according to the prior art. This structure of mouse comprises a ball (10), two wheels (20) disposed at right angles and turned by the ball (10) to move the cursor of the computer system subject to the direction and amount of the movement of the ball (10), and key switches 30 for inputting command signal to the computer system. The diameter of the ball (10) is about 2 cm. When in use, the ball (10) of the mouse is moved on a 20 cm×20 cm mouse pad. Because of the use of the mouse pad, much table space is required. Furthermore, one hand will get tired quickly when frequently moving the ball (10) on the mouse pad.

SUMMARY OF THE INVENTION

The present invention has been accomplished to provide a mouse which eliminates the aforesaid drawbacks. According to the preferred embodiment of the present invention, the mouse comprises a top cover which has press keys for signal input into the computer, a coupling device at the bottom, a downward rod with a center axle hole, and a plurality of locating posts; a circuit board which has an operation circuit and an IC, a plurality of switches corresponding to the press keys of the top cover shell, and a plurality of locating holes respectively connected to the locating posts of the top cover shell by a respective screw; a case-like intermediate shell which has an opening through which the downward rod of the top cover shell pass, a plurality of hook holes near the rear side, and a plurality of screw holes respectively fixed to the coupling device of the top cover shell by screws; and a bottom shell fitting over the intermediate shell at the bottom which has an upright index rod inserted through the opening of the intermediate shell and fitted into the center axle hole of the downward rod of the top cover shell and having a cable connected to the IC of the circuit board, and a plurality of upright hooks respectively hooked in the hook holes of the intermediate shell.

DETAILED DESCRIPTION OF THE PREFERRED EMBODIMENT

Figure 1:
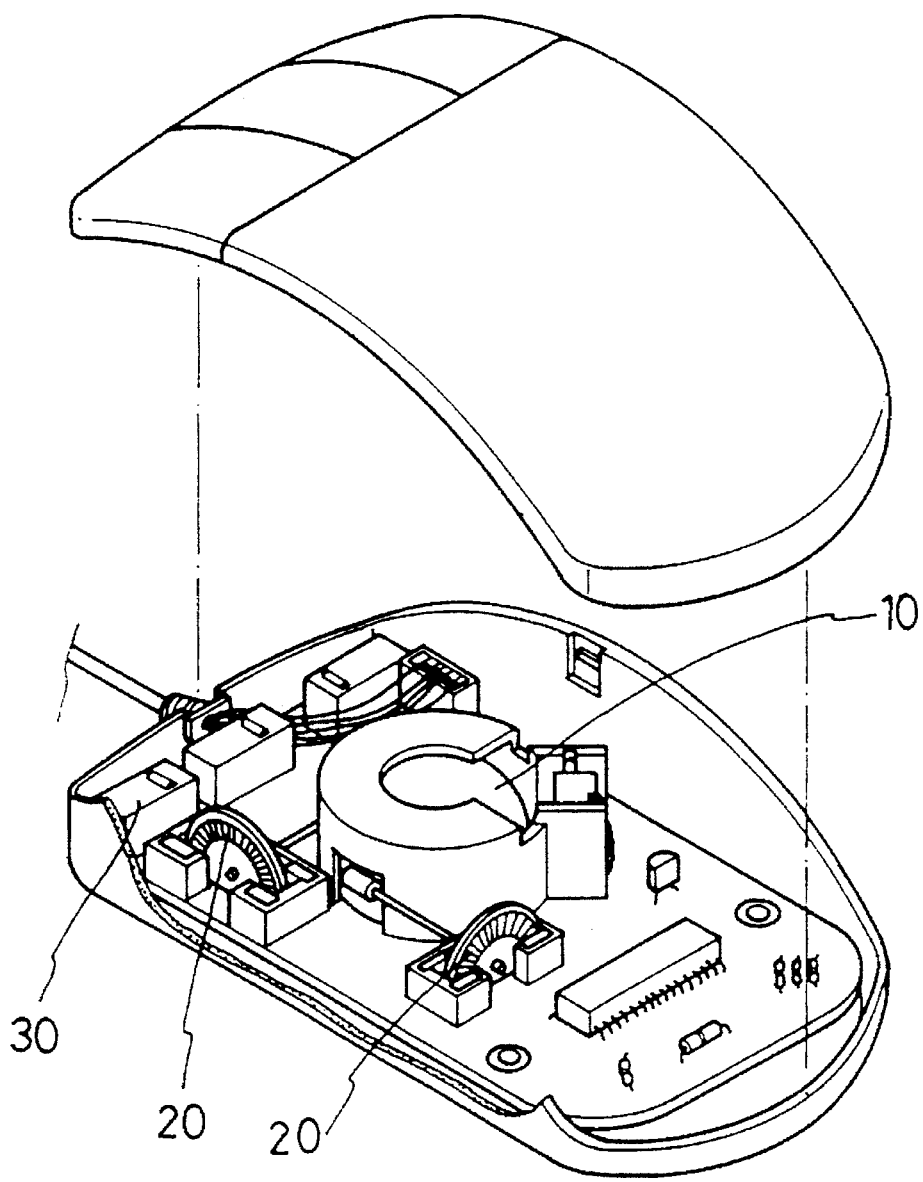
FIG. 1 shows the internal structure of a mouse according to the prior art.
Figure 2:
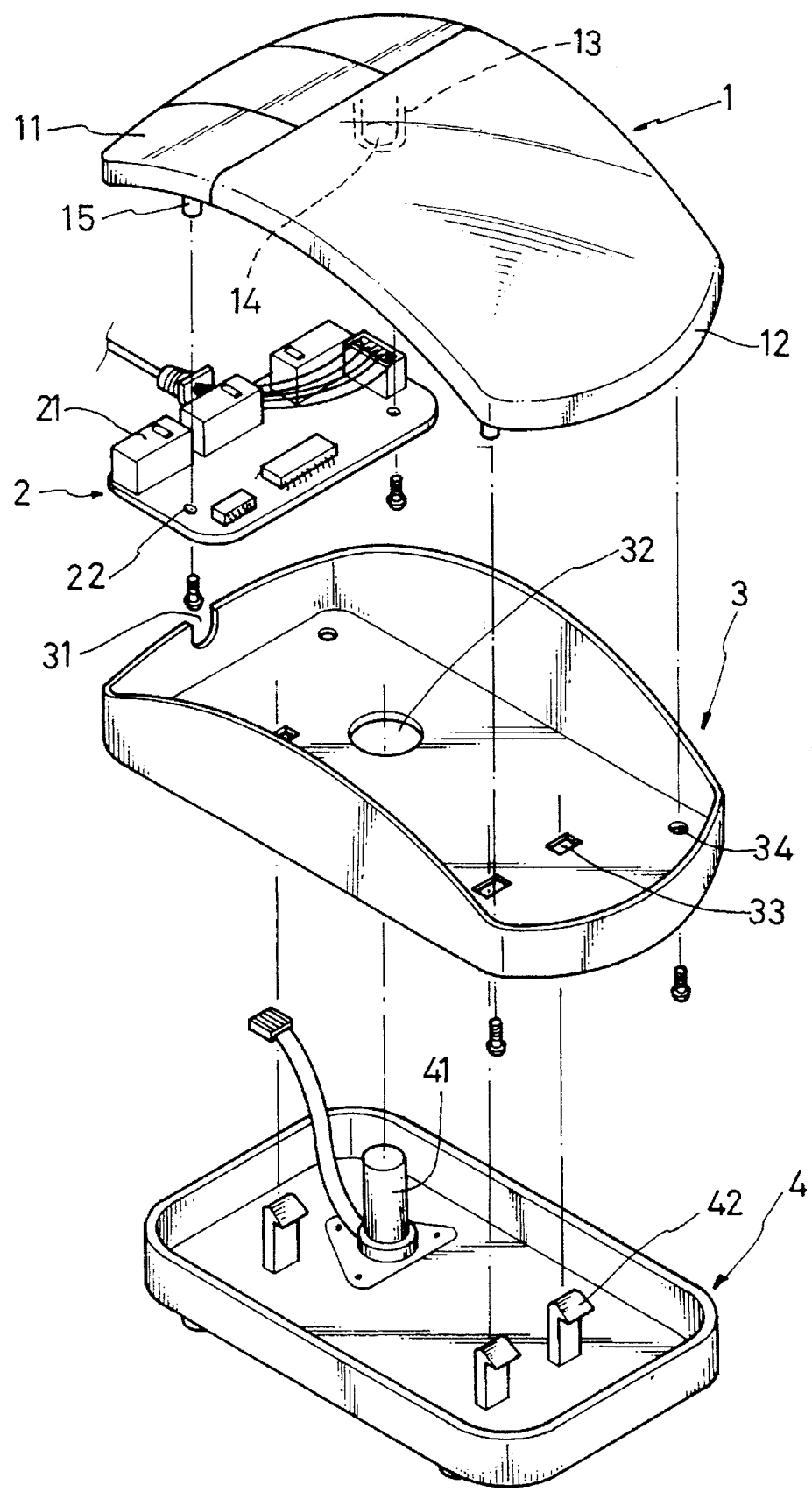
FIG. 2 is an exploded view of a mouse according to the preferred embodiment of the present invention.
Figure 3:
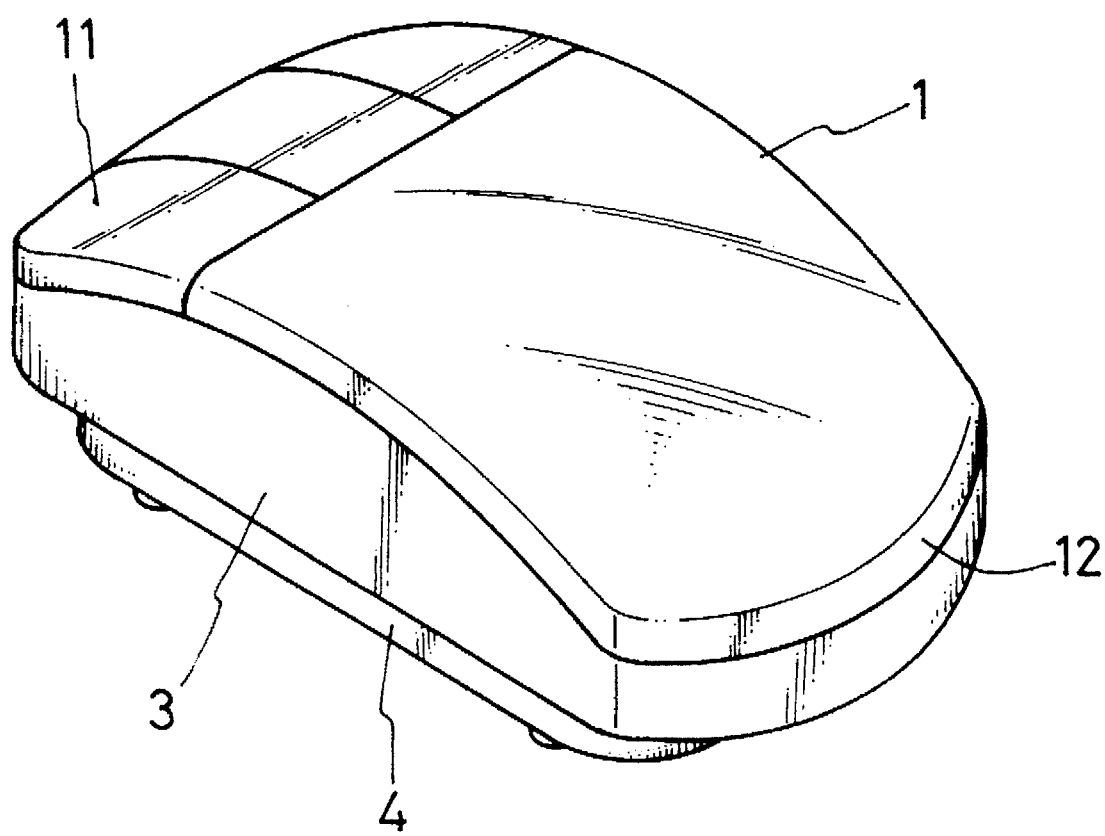
FIG. 3 is an elevational view of the mouse shown in FIG. 2.

Referring to FIGS. 2, and 3, a mouse in accordance with the present invention is generally comprised of a top cover shell 1, a circuit board 2, an intermediate shell 3, and a bottom shell 4.

The top cover shell 1 has a smoothly curved profile fitting the palm of the hand, having a plurality of pivoted press keys 11 at the front side adapted for triggering a respective contact on the circuit board 2, a coupling device 12 at the bottom adapted for fastening to the intermediate shell 3 (as one embodiment of the present invention, the coupling device 12 is comprised of a plurality of downward locating posts), a downward rod 13 which has a center axle hole 14, and at least one for example two downward locating posts 15 raised from the bottom at two opposite sides relative to the downward rod 13 and adapted for securing the circuit board 2.

The circuit board 2 is adapted for connecting to a computer system by a cable thereof for controlling the movement of the cursor by means of the operation of an operation circuit thereof (because the operation circuit is of the prior art, it is not described in detail), having a plurality of switches 21 corresponding to the press keys 11 of the top cover shell 1, and a plurality of locating holes 22 respectively connected to the locating posts 15 of the top cover shell 1 by a respective screw.

The intermediate shell 3 is a case-like shell having a wire hole 31 at the front side for the passing of the cable of the circuit board 2, an opening 32 in the middle for the passing of the downward rod 13 of the top cover shell 1, a plurality of hook holes 33 near the rear side for coupling to the bottom shell 4, and a plurality of screw holes 34 respectively fixed to the coupling device 12 of the top cover shell 1 by screws.

The bottom shell 4 fitting over the bottom side of the intermediate shell 3, having an upright index rod 41 inserted through the opening 32 of the intermediate shell 33 and fitted into the center axle hole 14 of the downward rod 13 of the top cover shell 1, and a plurality of upright hooks 42 respectively hooked in the hook holes 33 of the intermediate shell 3. The upright index rod 41 has a cable at the bottom connected to the integrated circuit of the circuit board 2.

Referring to FIGS. 2 and 3 again, when the circuit board 2 is fixed to the bottom side of the top cover shell 1 by fastening the locating holes 22 to the locating posts 15 by screws, the intermediate shell 3 is covered over the circuit board 2 and fixedly secured to the top cover shell 1 by fastening the screw holes 34 to the coupling device 12 of the top cover shell 1 by screws, and then the bottom shell 4 is fixedly secured to the intermediate shell 3 by forcing the upright hooks 42 into engagement with the hook holes 33, permitting the upright index rod 41 to be forced through the opening 32 into the center axle hole 14 of the downward rod 13.

When the top cover shell 1 is oscillated after the mouse is electrically connected to the computer system, the upright index rod 41 is synchronously oscillated. Therefore, by moving the upright index rod 41 up, down, leftward, or rightward, the piezoelectric induction circuit of the circuit board 2 is induced to move the cursor on the X-axis and Y-axis corresponding to the amount and direction of the pressure given to the upright index rod 41. Furthermore, the operator can press the press keys 11 for inputting signal to the computer system.

While only one embodiment of the present invention has been shown and described, it will be understood that various modifications and changes could be made without departing from the spirit and scope of the invention disclosed.

What the invention claimed is:

1. A mouse comprising:

a top cover shell having a plurality of pivoted press keys at a front side thereof adapted for triggering a respective contact on a circuit board, a coupling device at a bottom side thereof, a downward rod defining a center axle hole, and a plurality of locating posts raised from the bottom side;

a circuit board adapted for connecting to a computer system by a cable thereof for controlling the movement of the cursor, having an operation circuit and an integrated circuit, a plurality of switches corresponding to the press keys of said top cover shell, and a plurality of locating holes respectively connected to the locating posts of said top cover shell by a respective screw;

a case-like intermediate shell having, an opening in the middle, which receives the downward rod of said top cover shell, a plurality of hook holes near a rear side thereof, and a plurality of screw holes respectively fixed to the coupling device of said top cover shell by screws; and a bottom shell fitting over said intermediate shell at one side opposite to said top cover shell, having an upright index rod inserted through the opening of said intermediate shell and fitted into the center axle hole of the downward rod of said top cover shell and having a cable connected to the integrated circuit of said circuit board, and a plurality of upright hooks respectively hooked in the hook holes of said intermediate shell.

2. The mouse of claim 1 wherein said intermediate shell has a wire hole at a front side thereof for the passing of the cable of said circuit board.

* * * * *